US012681521B2

(12) United States Patent
Lin et al.

(10) Patent No.: US 12,681,521 B2
(45) Date of Patent: Jul. 14, 2026

(54) TECHNIQUES FOR VOLTAGE REFERENCE CIRCUITS WITH ADAPTIVE POWER CYCLING

(71) Applicant: Cypress Semiconductor Corporation, San Jose, CA (US)

(72) Inventors: Adrian Lin, Austin, TX (US); David Lovelace, Lakeway, TX (US)

(73) Assignee: Infineon Technologies Americas Corp., San Jose, CA (US)

( * ) Notice: Subject to any disclaimer, the term of this patent is extended or adjusted under 35 U.S.C. 154(b) by 174 days.

(21) Appl. No.: 18/633,165

(22) Filed: Apr. 11, 2024

(65) Prior Publication Data

US 2025/0321604 A1 Oct. 16, 2025

(51) Int. Cl.
G05F 3/24 (2006.01)
G06F 1/26 (2006.01)

(52) U.S. Cl.
CPC . G05F 3/24 (2013.01); G06F 1/26 (2013.01)

(58) Field of Classification Search
CPC ..... G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463; G05F 1/468; G05F 1/46; G05F 1/461; G05F 1/575; G05F 1/465

See application file for complete search history.

(56) References Cited

U.S. PATENT DOCUMENTS

| | | | | |
|---|---|---|---|---|
| 8,847,911 B2* | 9/2014 | Klein | ..................... | G06F 3/044 |
| | | | | 345/173 |
| 9,989,984 B2* | 6/2018 | Tseng | ........................ | G05F 3/24 |
| 11,573,589 B2* | 2/2023 | Hung | ........................ | G05F 3/24 |
| 11,984,907 B2* | 5/2024 | Lim | .................... | H03M 1/0678 |
| 2001/0001231 A1* | 5/2001 | Rapp | ................... | H03K 5/2472 |
| | | | | 327/536 |
| 2012/0326695 A1* | 12/2012 | Chen | ................... | G11C 11/4074 |
| | | | | 323/313 |
| 2019/0041433 A1* | 2/2019 | Tseng | ....................... | H03K 5/24 |

* cited by examiner

*Primary Examiner* — Crystal L Hammond
*Assistant Examiner* — Nusrat Quddus

(57) ABSTRACT

A voltage across a first capacitor and a voltage across a second capacitor are set to a reference voltage via a reference voltage source. The first and second capacitors are disconnected from the reference voltage source and the reference voltage is turned-off. A processing device turns-on the reference voltage in response to determining a voltage difference between the first and second capacitors due to leakage current is at or above a threshold level. The first and second capacitors are connected to the reference voltage source to return the voltage across the first capacitor and the voltage across the second capacitor to the reference voltage.

20 Claims, 7 Drawing Sheets

TECHNIQUES FOR VOLTAGE REFERENCE CIRCUITS WITH ADAPTIVE POWER CYCLING

TECHNICAL FIELD

The present disclosure relates generally to the field of voltage reference circuits, and more particularly, to techniques for voltage reference circuits with adaptive power cycling.

BACKGROUND

A voltage reference, or reference voltage source, is generally an electronic device that ideally produces a fixed voltage irrespective of conditions, such as technology or process variations, power supply variations, temperature changes, and the passage of time. This fixed voltage is referred to as a reference voltage. One type of voltage reference is a bandgap voltage reference. Bandgap voltage references are widely used in integrated circuits to provide a reference voltage close to the corresponding theoretical band gap of silicon (e.g., around 1.25 volts). Computing devices, such as integrated circuits, demand at least one voltage reference to operate properly.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
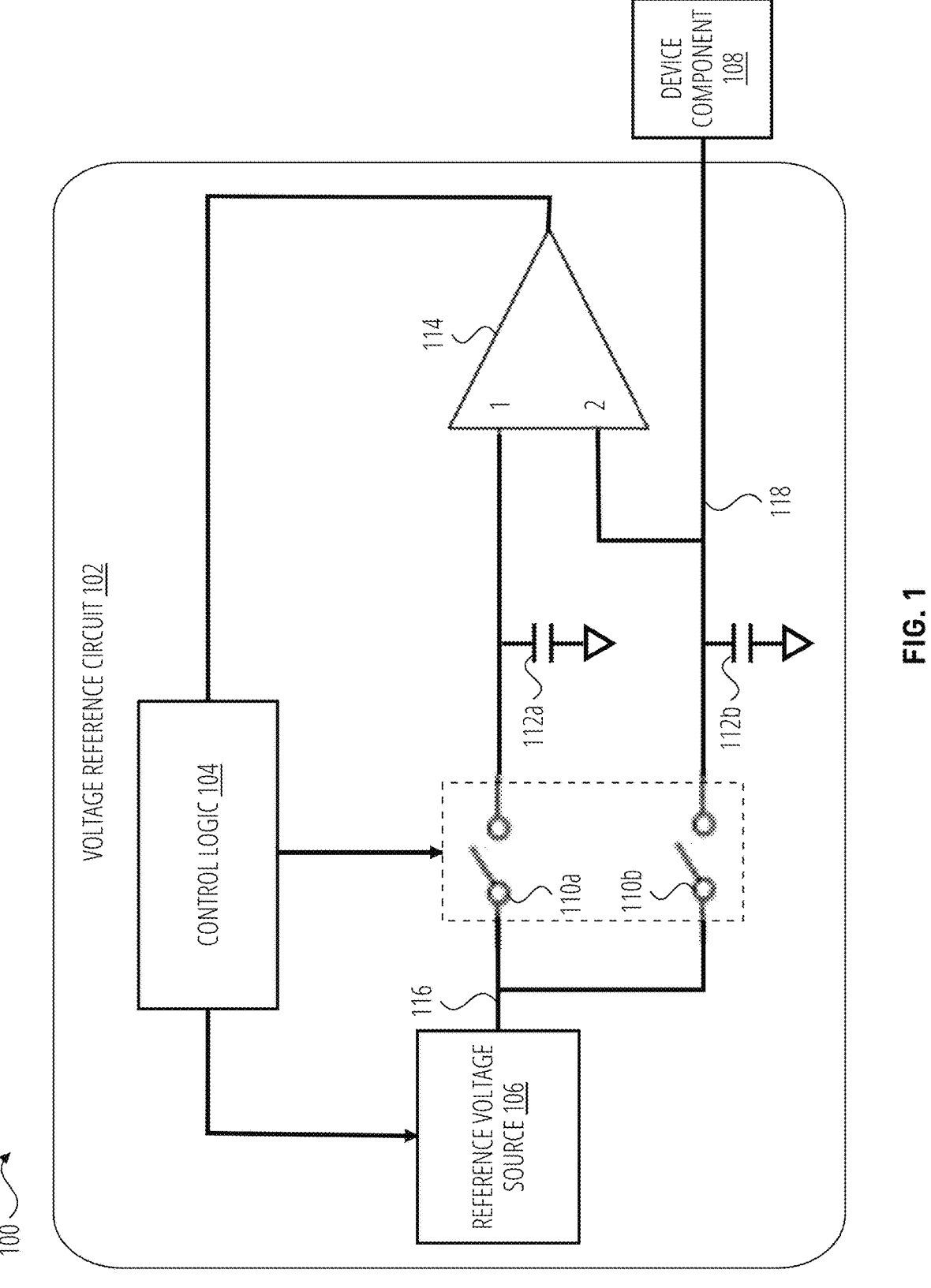
FIG. 1 illustrates an exemplary computing device with a voltage reference circuit for dynamic power cycling according to some embodiments.

The following description sets forth numerous specific details such as examples of specific systems, components, methods, and so forth, in order to provide a good understanding of various embodiments of the techniques described herein for significantly decreasing computing device power consumption. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the scope of the present disclosure.

Computing devices often require a time and temperature invariant voltage reference to operate properly, which, as discussed above, is typically provided by a reference voltage source, such as a bandgap voltage reference. A voltage reference can demand a significant amount of power to meet the accuracy and settling time demands of computing devices. However, the current draw of computing devices can vary significantly, such as between active and low power modes of operation. For example, when in an active mode, computing devices may require additional current to continuously operate the voltage reference, but when in a low power mode, computing devices often requires the voltage reference to operate with significantly less current. Accordingly, a voltage reference may be power cycled (i.e., turned on and off) to reduce the power demands of the voltage reference. While the voltage reference is turned-off, an energy storage device, such as a capacitor, may be utilized to provide the computing device with a sufficiently accurate reference voltage) to maintain proper operation. The ratio of the on-time to the cycle period (i.e., the duty cycle) of a voltage reference is directly proportional to the average current draw. Thus, a lower duty cycle results in a lower average current draw (e.g., a lower quiescent current) and therefore reducing average power consumption.

One challenge caused by power cycling a voltage reference is maintaining the same reference voltage when the reference voltage source (e.g., bandgap voltage circuit) is enabled (i.e., turned on) and disabled (i.e., turned off). The difference between the reference voltage when the reference voltage source is on and when the reference voltage source is off introduces a voltage ripple onto the reference voltage. This voltage ripple can cause problems in downstream circuits dependent on the reference voltage. For example, certain modes, such as under voltage lock-out (UVLO) or brown-out may be inadvertently turned on or off. Existing techniques for power cycling a voltage reference utilize an oscillator to periodically turn the voltage reference on and off. However, due to the periodic nature of the power cycling, existing techniques are rigid and unable to adapt to conditions that affect performance of the voltage reference, such as temperature and process variations. Adding further complexity, existing techniques must be able to prevent excessive voltage ripples at the worst process corners. This forces existing techniques to utilize a fixed duty cycle that supports proper operation over the worst process and temperature corners, resulting in excess power demands and degrading efficiency. For example, when the duty cycle could be lowered to save power, existing techniques are unable to minimize the duty cycle to support proper operation at other process corner and temperature variations. These limitations can drastically reduce the efficiency and adaptability of voltage references, contributing to excess power consumption.

Embodiments of the present disclosure address the above and other problems with techniques to adaptively adjust the duty cycle of a voltage reference source to maintain an acceptable ripple voltage while simultaneously minimizing the quiescent current during low-power, efficiency, or sleep mode. For example, the duty cycle may be adjusted in response to temperature changes such that the duty cycle is optimized for the current temperature. In many embodiments, the duty cycle may be dynamically adjusted based on a maximum allowable ripple voltage. For example, a voltage difference between two capacitors may be monitored to determine when to turn-on the voltage reference source. The reference voltage ripple is set by the threshold level of hysteresis in the comparator monitoring the voltage differences between the two capacitors. In such examples, the maximum ripple voltage divided by the ratio of the capacitance of the two capacitors may be utilized to determine the threshold level of comparator hysteresis between the two capacitors. The hysteresis threshold is correlated to a maximum acceptable change in the voltage across the first capacitor minus a change in the voltage across the second capacitor. It will be appreciated that hysteresis is a property of the comparator, not the voltage difference itself. In several embodiments, these techniques may be implemented in a variety of devices with voltage reference circuits, such as a power management unit (PMU), a system on chip (SoC), or an analog voltage reference. In several such embodiments, these techniques may be utilized to reduce quiescent current draw in low-power, sleep, or efficiency modes of operation.

In an illustrative embodiment, a voltage reference circuit may include control logic configured to set a voltage across a first capacitor and a voltage across a second capacitor to a reference voltage via a reference voltage source (e.g., a bandgap voltage reference). Next, the control logic may operate a first switch connected between the reference voltage source to disconnect the first capacitor and operate a second switch connected between the reference voltage source to disconnect the second capacitor. Additionally, the reference voltage source is turned-off by the control logic to reduce current draw. As soon as the first and second capacitors are disconnected, a voltage difference between the two capacitors may begin to build up due to leakage currents. When the voltage difference between the first and second capacitors reaches a threshold level exceeding the comparator hysteresis threshold, the control logic may turn-on the reference voltage source and close the first and second switches to connect the first and second capacitors to the reference voltage source returning the voltage across the capacitors to the reference voltage.

In these and other ways, components/techniques described hereby may provide many technical advantages. For example, embodiments may reduce power demands (e.g., reduce quiescent current) and increase efficiency of computing devices, such as integrated circuits. In yet another example, power cycling may be performed in a dynamic manner that adapts the duty cycle to minimize current draw without exceeding a maximum acceptable ripple voltage. Further, low quiescent current operation can be a critical parameter in Bluetooth® Low Energy (BLE), Wi-Fi, and microcontroller (MC) products and is a prominent datasheet comparison parameter. The techniques described hereby can provide a key building block for efficient architectures, such as power management and analog devices. Thus, the techniques of the current disclosure improve performance of computing devices and voltage reference circuits as compared to conventional approaches. Further, embodiments disclosed hereby can be practically utilized to improve the functioning of a computer and/or to improve a variety of technical fields including power electronics.

The illustrative examples and embodiments provided above are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 illustrates an exemplary computing device 100 with a voltage reference circuit 102 for dynamic power cycling according to some embodiments. The illustrated embodiment includes the voltage reference circuit 102 and device component 108. The voltage reference circuit 102 includes control logic 104, reference voltage source 106, device component 108, switches 110a, 110b (collectively referred to as switches 110), capacitors 112a, 112b (collectively referred to as capacitors 112), and hysteresis comparator 114. The components of voltage reference circuit 102 may operate in conjunction to prevent excessive voltage ripple while reducing current draw by dynamically adapting the duty cycle of reference voltage source 106 based on voltage difference between capacitors 112 due to their different capacitance. One or more components of FIG. 1 may be the same or similar to one or more other components disclosed hereby. Further, aspects discussed with respect to various components in FIG. 1 may be implemented by one or more other components from one or more other embodiments without departing from the scope of this disclosure. For example, one or more portions of or one or more techniques implemented by control logic 104 may be implemented by other components of the computing device 100, such as a central processing unit, without departing from the scope of this disclosure. Embodiments are not limited in this context.

The control logic 104 may direct and coordinate operation of the voltage reference circuit 102. For example, control logic 104 may receive inputs from one or more components of voltage reference circuit 102 and generate one or more outputs, such as based on the inputs, to implement various techniques disclosed hereby. In many embodiments, control logic 104 may power cycle reference voltage source 106 and operate switches 110 based on signals received from hysteresis comparator 114. The hysteresis comparator 114 may be coupled to the capacitor 112a via a first input, or terminal, and the capacitor 112b via a second input, or terminal. Further, the output of the hysteresis comparator 114 may be coupled to the control logic 104. In many embodiments, the hysteresis comparator is configured to generate output signals based on a voltage difference between the first and second capacitors 112. In many such embodiments, the control logic 104 may power cycle the reference voltage source 106 based on the output signals of the hysteresis comparator. It will be appreciated that the downward facing triangles correspond to a ground reference voltage. The reference voltage source 106 may include a voltage reference, such as a bandgap voltage reference. The device component 108 may include, or coupled to, one or more portions of the computing device 100 that rely on a reference voltage produced by reference voltage source 106.

In one embodiment, the voltage reference circuit 102 may operate as follows. The reference voltage source 106 may be continually powered and switches 110 may remain closed while the computing device 100 is in a continuous mode of operation. Thus, during the continuous mode of operation, the capacitors (i.e., the voltage across the capacitors) are set to the reference voltage 116. However, when the computing device 100 transitions to a low-power mode of operation, the control logic 104 may open switches 110 and turn-off the reference voltage source 106. In response to opening the switches 110, a voltage difference may begin to build up between the capacitors 112 due to leakage current affecting the voltage across capacitors 112 at different rates. More generally, the voltage difference may refer to a change in the voltage across the capacitor 112*a* minus a change in the voltage across the capacitor 112*b*. Eventually, the voltage difference reaches the threshold hysteresis level of comparator 114 causing the comparator to emit a signal that informs the control logic 104 that the threshold level between the capacitors has been reached. In response, the control logic 104 may turn on the reference voltage source 106 and close switches 110 to charge capacitors 112 to the reference voltage.

The output voltage 118 may be the reference voltage seen by downstream components of computing device 100, such as device component 108. The device component may be coupled in parallel to the capacitor 112*b* and the second terminal of hysteresis comparator 114. Due to the leakage current, the output voltage 118 may become different than the reference voltage 116 (when reference voltage source 106 is turned on). This difference represents the ripple voltage relative to the reference voltage 116. However, in various embodiments, the hysteresis comparator 114 may utilize the voltage difference between capacitors 112 to monitor the ripple voltage. In various such embodiments, control logic 104 will turn on the reference voltage source 106 and close switches 110 when the voltage difference between capacitors 112 exceeds the comparator hysteresis threshold. The hysteresis threshold is set to correspond to a voltage level below a maximum acceptable ripple voltage for downstream components of the computing device 100. Many embodiments disclosed hereby correlate hysteresis threshold voltage, hence the ripple voltage using the capacitance ratio of capacitor 112*b* to capacitor 112*a*. In many such embodiments, the capacitance of capacitor 112*b* may be several multiples of the capacitance of capacitor 112*a*, such as 5 to 25 times as much. For example, the capacitance of capacitor 112*b* may be 13 times larger than the capacitance of capacitor 112*a*. By relying on a parameter that is correlated to the amount of ripple voltage that will occur, control logic 104 can adapt the duty cycle based on conditions, such as temperature, to minimize the amount of time reference voltage source 106 is turned on, thereby reducing current demand. For example, the quiescent current of an integrated circuit may be reduced using the techniques disclosed hereby. More generally, quiescent current refers to the average current consumed by an integrated circuit.

In various embodiments, the primary source leakage current that affects the capacitors 112 may be caused by the switches 110. Accordingly, the switches 110 should be selected to have the same leakage current profiles. As will be discussed in more detail below, the switches 110 may be metal-oxide-semiconductor field-effect transistors (MOS-FETs). However, in some embodiments, other components may cause some leakage current that affects the capacitors 112. For example, device component 108 may cause some leakage current that affects capacitor 112*b*. In such embodiments, the leakage current caused by device component 108 may be duplicated on the portion of the voltage reference circuit 102 between switch 110*a* and the first (e.g., positive) terminal, or input, of hysteresis comparator 114. More generally, the voltage reference circuit 102 may be designed such that the leakage current affecting capacitor 112*a* is the same as the leakage current affecting capacitor 112*b*.

Figure 2:
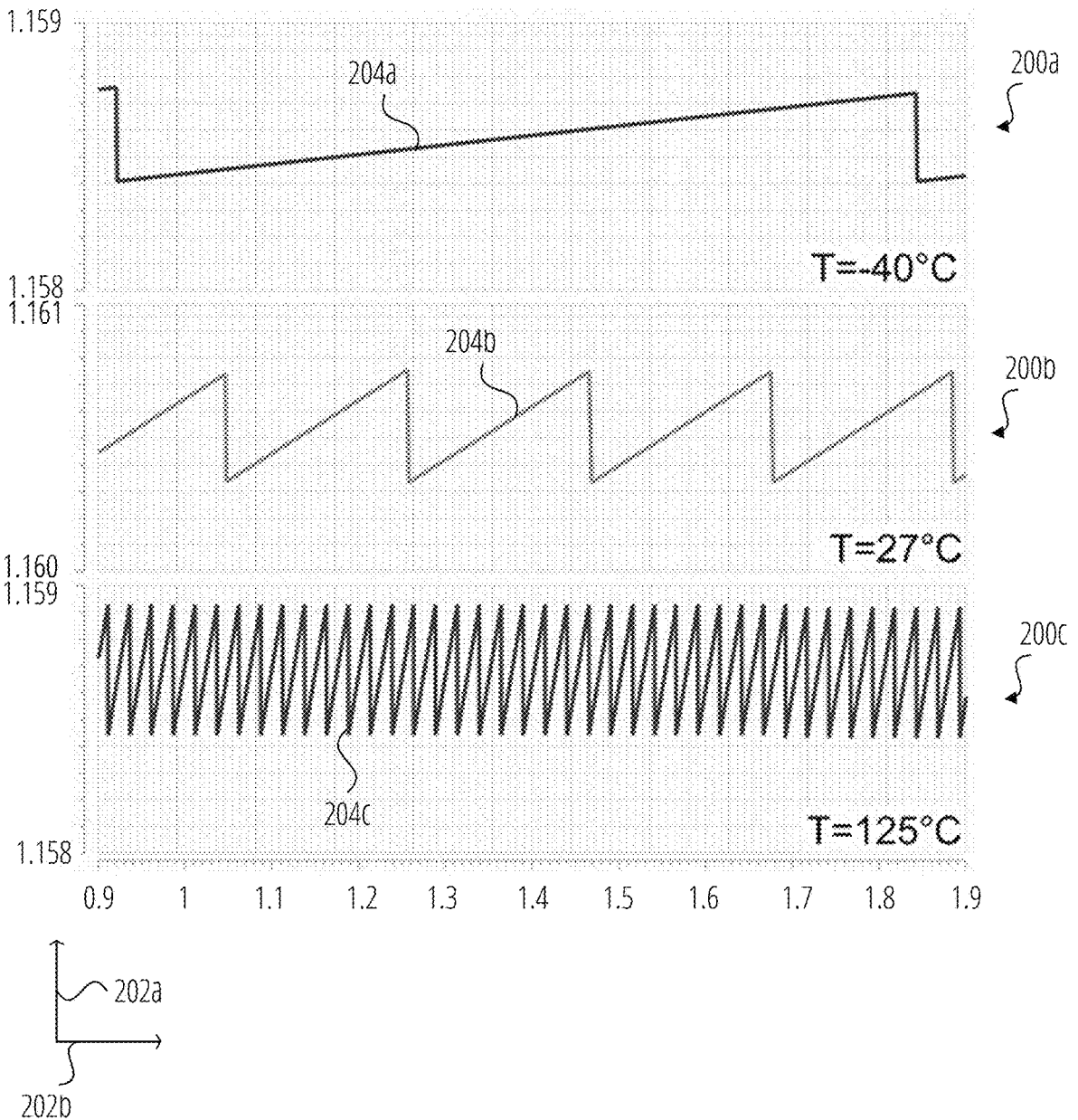
FIG. 2 illustrates various plots of voltage output for a voltage reference circuit with adaptive power cycling operating at different temperatures according to some embodiments.

FIG. 2 illustrates various plots of voltage output for a voltage reference circuit with adaptive power cycling operating at different temperatures according to some embodiments. More specifically, plot 200*a* corresponds to power cycling an exemplary voltage reference at −40 degrees Celsius, plot 200*b* corresponds to power cycling the exemplary voltage reference at 27 degrees Celsius, and plot 200*c* corresponds to power cycling the exemplary voltage reference at 125 degrees Celsius. Each of the plots 200*a*, 200*b*, 200*c* (collectively referred to as plots 200) include a voltage-axis 202*a* and a time-axis 202*b*. Further, each of the plotted lines correspond to the output voltage of a voltage reference circuit (e.g., output voltage 118 of voltage reference circuit 102), which in this context may simply be referred to as the reference voltage. Additionally, the slope portions of the plotted lines correspond to the effects of leakage current on the voltage across a capacitor (e.g., capacitor 112*b*) over time and the steps in the plotted lines may correspond to turning the voltage reference on after a hysteresis threshold level is reached. Further, the difference in voltage between the highest and lowest points of each step may be equal to the ripple voltage. One or more components of FIG. 2 may be the same or similar to one or more other components disclosed hereby. Further, aspects discussed with respect to various components in FIG. 2 may be implemented by one or more other components from one or more other embodiments without departing from the scope of this disclosure. For example, the plots 200 may correspond to the voltage seen by device component 108 when power cycling reference voltage source 106 at different temperatures. Embodiments are not limited in this context.

As previously mentioned, various conditions can affect the operation of a voltage reference. However, utilizing techniques disclosed hereby, the duty cycle of the power cycle can be dynamically adapted, such as shown in plots 200, to account for variations in these conditions. Further, the voltage in plots 200 is increasing. This may result from using p-type MOSFETS as switches, which is discussed in more detail below, such as with respect to FIGS. 3A and 3B.

Referring to plot 200*a*, the output voltage 204*a* (e.g., output voltage 118 or the voltage across capacitor 112*b*) may vary while the reference voltage source 106 is power cycled at −40 degrees Celsius. As shown in the illustrated embodiment, colder temperatures may enable the duty cycle of the voltage reference to be relatively lower than with warmer temperatures. In plot 200*a*, the cycle period of the duty cycle may be approximately 921 milliseconds, the ripple voltage may be approximately 328 microvolts, and the total average current may be 7.5 nanoamps, which may represent an improvement factor of approximately 2000 when compared to continually operating the voltage reference and an improvement factor of approximately 40 over existing static duty cycle approaches.

Referring to plot 200*b*, the output voltage 204*b* (e.g., output voltage 118 or the voltage across capacitor 112*b*) may vary while the reference voltage source 106 is power cycled at 27 degrees Celsius. As shown in the illustrated embodiment, moderate temperatures may enable the duty cycle of the voltage reference to be relatively higher than with cold temperatures and relatively lower than with hot temperatures. In plot 200*b*, the cycle period of the duty cycle may be approximately 210 milliseconds, the ripple voltage may be approximately 419 microvolts, and the total average current may be 14.9 nanoamps, which may represent an improvement factor of approximately 1175 when compared to continually operating the voltage reference and an improvement factor of approximately 24 over existing static duty cycle approaches.

Referring to plot 200*c*, the output voltage 204*c* (e.g., output voltage 118 or the voltage across capacitor 112*b*) may vary while the reference voltage source 106 is power cycled at 125 degrees Celsius. This temperature may correspond to a process corner. As shown in the illustrated embodiment, hot temperatures may demand a relatively higher duty cycle than with lower temperatures. Accordingly, the techniques disclosed hereby enable the duty cycle to adapt to conditions of a voltage reference to minimize the duty cycle while still maintaining an acceptable ripple voltage. In plot 200c, the cycle period of the duty cycle may be approximately 26.7 milliseconds, the ripple voltage may be approximately 515 microvolts, and the total average current may be 218.8 nanoamps, which may represent an improvement factor of approximately 100 when compared to continually operating the voltage reference and an improvement factor of approximately 2 over existing static duty cycle approaches.

Figure 3A:
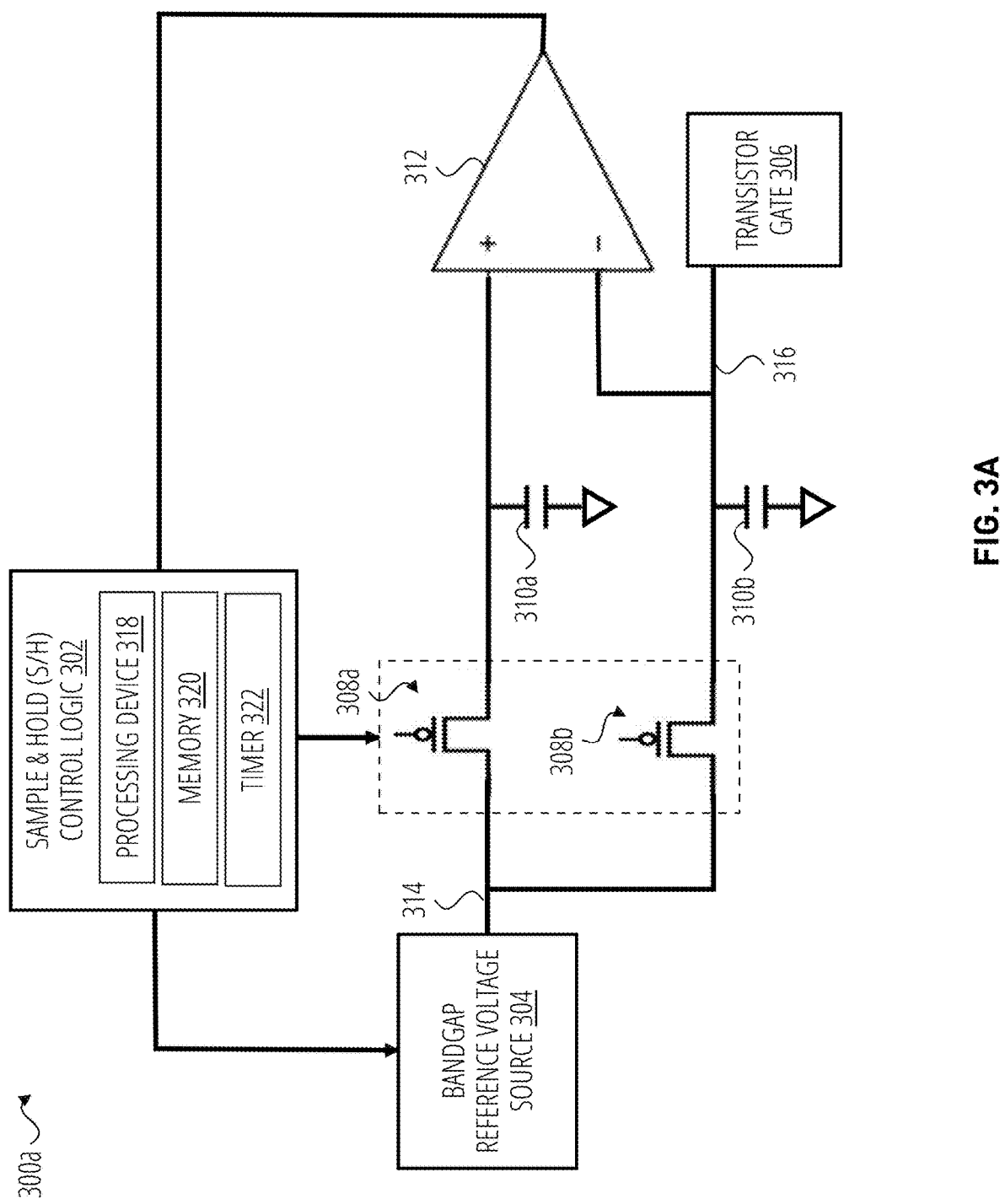
FIG. 3A illustrates a bandgap voltage reference circuit according to some embodiments.

FIG. 3A illustrates a bandgap voltage reference circuit 300a according to some embodiments. In the illustrated embodiment, the bandgap voltage reference circuit 300a includes sample and hold (S/H) control logic 302, a bandgap reference voltage source 304, transistor gate 306, pMOS transistors 308a, 308b (collectively referred to as pMOS transistors 308), capacitors 310a, 310b (collectively referred to as capacitors 310), and hysteresis comparator 312. The S/H control logic 302 includes processing device 318, memory 320, and timer 322. The components of bandgap voltage reference circuit 300a may operate in conjunction to prevent excessive voltage ripple while reducing current draw by dynamically adapting the duty cycle of the bandgap reference voltage source 304 based on voltage difference between capacitors 310. One or more components of FIG. 3A may be the same or similar to one or more other components disclosed hereby. For example, S/H control logic 302 may be the same or similar to control logic 104. In another example, pMOS transistors 308 may be the same or similar to switches 110. In yet another example, transistor gate 306 may be the same or similar to device component 108. Further, aspects discussed with respect to various components in FIG. 3A may be implemented by one or more other components from one or more other embodiments without departing from the scope of this disclosure. For example, bandgap voltage reference circuit 300a may be implemented by computing device 100, such as in place of voltage reference circuit 102, without departing from the scope of this disclosure. Embodiments are not limited in this context.

The S/H control logic 302 may generally coordinate and control operation of the bandgap voltage reference circuit 300a. For example, the processing device 318 may receive inputs, such as from hysteresis comparator 312, and, based on the input, generate one or more outputs, such as to turn-on or turn-off bandgap reference voltage source 304 and open or close pMOS transistors 308 to adapt the duty cycle of bandgap reference voltage source 304 based on a maximum acceptable ripple voltage. In some embodiments, the memory 320 may store the maximum acceptable ripple voltage between the capacitors 310. In some embodiments, the S/H control logic 302 may configure hysteresis comparator 312 to signal the S/H control logic 302 when the voltage difference between capacitors 310 reaches the hysteresis threshold level. Further, as discussed in more detail below, such as with respect to timing diagram 340 of FIG. 3C, the memory 320 may store various timing or counter values corresponding to delays between operating various components of the bandgap voltage reference circuit 300a (e.g., delay between turning bandgap reference voltage source 304 on and connecting capacitors 310 to enable the output of bandgap reference voltage source 304 to stabilize). Accordingly, in various embodiments, the delay time between turning-on the reference voltage source and connecting the first and second capacitors to the reference voltage source and/or the delay time between disconnecting the first and second capacitors from the reference voltage source and turning-off the reference voltage source may be varied. The timer 322 may include one or more timers or counters to track and/or implement the delays. In some embodiments, the timer 322 may include one or more oscillators. In various embodiments, the timer 322 may be turned on and off to provide further power savings.

The transistor gate 306 may include a gate of a transistor in a downstream component of a computing device. In various embodiments, the transistor gate 306 may cause negligible leakage current.

It should be noted that although a single processing device (i.e., processing device 318) and a single storage device (i.e., memory 320) is depicted for simplicity, other embodiments may include multiple processing devices and/or multiple storage devices. The processing device 318 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 318 may also include one or more special-purpose processing devices such as an application specific integrated circuit (ASIC), a field programmable gate array (FPGA), a digital signal processor (DSP), network processor, or the like.

Figure 3B:
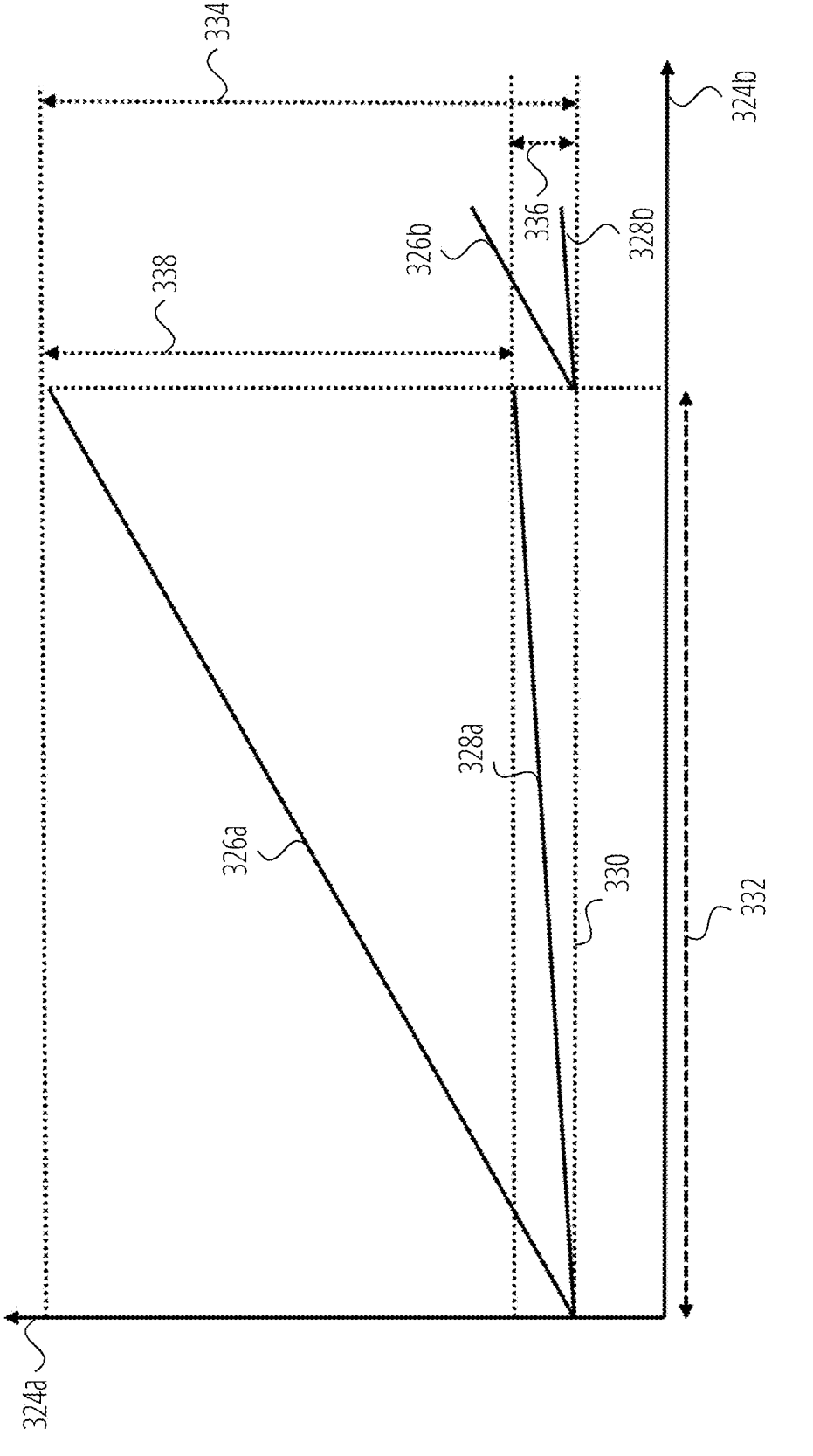
FIG. 3B illustrates an exemplary plot of voltages across the capacitors over time for the bandgap voltage reference circuit of FIG. 3A according to some embodiments.

FIG. 3B illustrates a plot 300b of voltages across the capacitors 310 over time for the bandgap voltage reference circuit 300a according to some embodiments. More specifically, plot 300b corresponds to power cycling the bandgap reference voltage source 304. The 300b includes a voltage-axis 324a and a time-axis 324b. Further, capacitor voltage 326a and capacitor voltage 326b correspond to the voltage across capacitor 310a over time and capacitor voltage 328a and capacitor voltage 328b correspond to the voltage across capacitor 310b over time. One or more components of FIG. 3B may be the same or similar to one or more other components disclosed hereby. For example, capacitor voltage 326a may be the same or similar to one or more portions of plot 200a. Further, aspects discussed with respect to various components in FIG. 3A may be implemented by one or more other components from one or more other embodiments without departing from the scope of this disclosure. For example, the plot 300b may correspond to the voltage seen by device component 108 when power cycling reference voltage source 106 at different temperatures. Embodiments are not limited in this context.

As shown in the illustrated embodiment, capacitor voltage 326a and capacitor voltage 326b may increase from the bandgap voltage 330 at different rates during the leakage period 332 (or cycle period). The increase of voltage may result from having the capacitors 310 connected to pMOS transistors. However, in other configurations, such as ones that utilize nMOS transistors, the capacitor voltages 326a, 326b may decrease instead of increasing. The bandgap voltage 330 may correspond to reference voltage 314 and the capacitor voltages 328a, 328b may correspond to the output voltage 316.

Capacitor voltage 326a and capacitor voltage 328a may correspond to a first power cycle with a leakage period 332 (or cycle period). During the leakage period 332, the capacitor voltage 326a may increase by a voltage change 334 and the capacitor voltage 328a may increase by a voltage change 336. The difference between the voltage change 334 (i.e., $\Delta V_{C1}$) and voltage change 336 (i.e., $\Delta V_{C2}$) may include the voltage difference 338 between the different capacitors.

Accordingly, when the voltage difference 338 reaches a threshold level based on the maximum acceptable ripple voltage, hysteresis comparator 312 may generate a signal informing S/H control logic 302 and causing S/H control logic 302 to turn on the bandgap reference voltage source 304 and connect capacitors 310. The relationships between these various parameters may adhere to the following equations, one or more of which may be implemented by components of the bandgap voltage reference circuit 300*a*. When the capacitance of the first capacitor, $C_1$, is much smaller (e.g., 8 or more times smaller) than the capacitance of the second capacitor, $C_2$, $$\left(\text{i.e., when } \frac{C_2}{C_1} \gg 1\right),$$

then the following relationships shown below in Equation 1 and Equation 2 can be utilized.

$$\text{Max ripple} \approx \frac{C_1}{C_2} \times \text{Hysteresis} \qquad \text{Equation 1}$$

$$\text{Cycle Period} = \frac{C_2 \times \text{Max ripple}}{I_{LKG}} \qquad \text{Equation 2}$$

In Equation 2, $I_{LKG}$ corresponds to the leakage current. Further, the capacitances, voltage changes, and hysteresis can be related as shown below in Equation 3, Equation 4, and Equation 5.

$$\Delta V_{C2} = \Delta V_{C1} - \text{Hysteresis} \qquad \text{Equation 3}$$

$$\Delta V_{C2} = \left(\frac{C_2}{C_1} \times \Delta V_{C2}\right) - \text{Hysteresis} \qquad \text{Equation 4}$$

$$\Delta V_{C2} = \frac{\text{Hysteresis}}{\frac{C_2}{C_1} - 1} \qquad \text{Equation 5}$$

As shown in the equations above, the voltage difference between the first and second capacitors may be defined as the voltage across the first capacitor minus the voltage across the second capacitor. This voltage difference eventually reaches the hysteresis threshold of the comparator. Further, the threshold level for hysteresis may be defined as the maximum acceptable ripple voltage divided by a ratio of a capacitance of the first capacitor to a capacitance of the second capacitor. In many embodiments, the capacitance of the second capacitor is at least five times the capacitance of the first capacitor. For example, the capacitance of the second capacitor may be 10 or 15 times the capacitance of the first capacitor. In one embodiment, utilizing the equations above, the maximum ripple voltage may be set at 400 microvolts by using a hysteresis threshold of 5 millivolts and a ratio of the second capacitor to the first capacitor of 13 to 1. In various embodiments, the maximum ripple voltage may be below 1 millivolt, such as 0.5 millivolts.

Figure 3C:
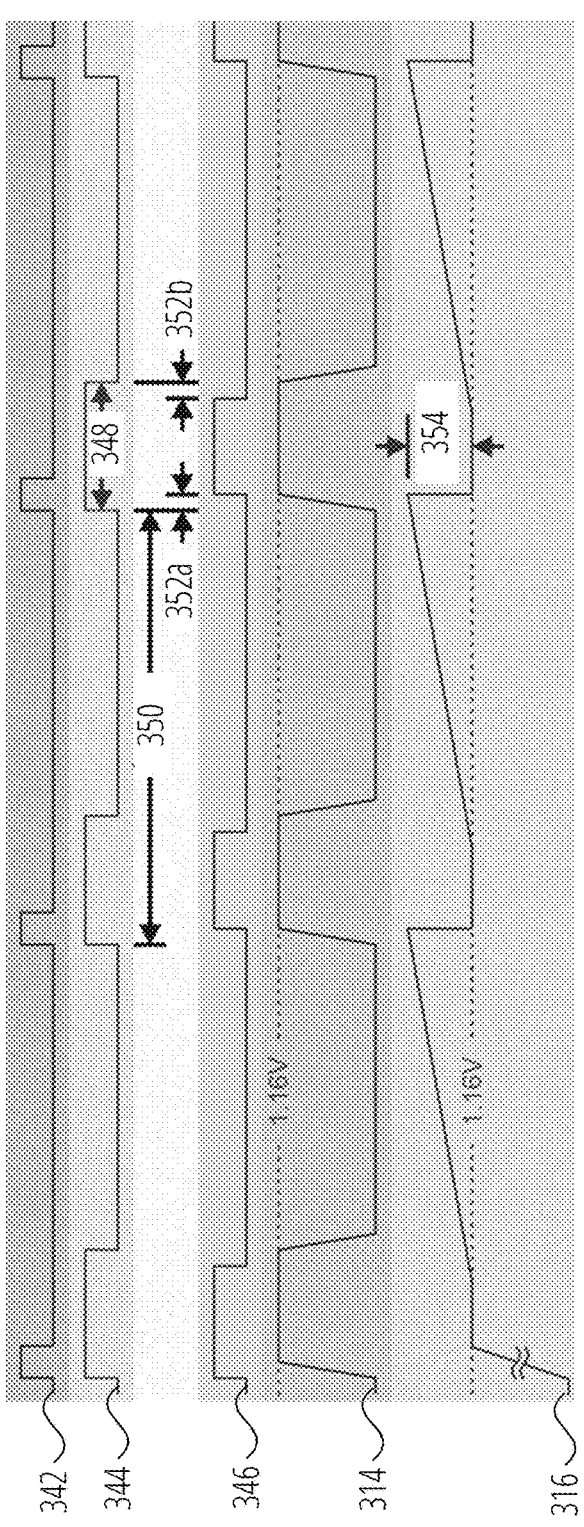
FIG. 3C illustrates an exemplary timing diagram for the bandgap voltage reference circuit of FIG. 3A according to some embodiments.

FIG. 3C illustrates a timing diagram 340 for the bandgap voltage reference circuit 300*a* according to some embodiments. In the illustrated embodiment, timing diagram 340 includes a threshold signal 342, a voltage source signal 344, a switch signal 346, a reference voltage 314, and an output voltage 316. The timing diagram 340 may correspond to signals exchanged between and parameters of various components of bandgap voltage reference circuit 300*a* to maintain a maximum acceptable voltage ripple 354 in the output voltage 316. One or more components of FIG. 3C may be the same or similar to one or more other components disclosed hereby. Further, aspects discussed with respect to various components in FIG. 3C may be implemented by one or more other components from one or more other embodiments without departing from the scope of this disclosure. For example, the timing diagram 340 may be implemented by voltage reference circuit 102 without departing from the scope of this disclosure. Embodiments are not limited in this context.

The threshold signal 342 may correspond to a signal generated by hysteresis comparator 312 in response to detecting a voltage difference between capacitors 310. Accordingly, in various embodiments, the signal may be high when the voltage difference between the capacitors 310 is at or above the threshold level and the signal may be low when the voltage difference between the capacitors 310 is below the threshold level.

The voltage source signal 344 may correspond to a signal generated by S/H control logic 302 to turn the bandgap reference voltage source 304 on or off. Accordingly, in some embodiments, the signal may be high when the bandgap reference voltage source 304 is on and the signal may be low when the bandgap reference voltage source 304 is off. Further, the cycle period 350 may correspond to the duty cycle and on-time 348 may correspond to the amount of time that the bandgap reference voltage source 304 is on.

The switch signal 346 may correspond to a signal generated by S/H control logic 302 to open or close the pMOS transistors 308. Accordingly, in many embodiments, the signal may be high when the pMOS transistors are closed and the signal may be low when the pMOS transistors are open. In several embodiments, the switches may be closed an amount of time (i.e., delay period 352*a*) after the bandgap reference voltage source 304 is turned on and the switches may be opened an amount of time (i.e., delay period 352*b*) before the bandgap reference voltage source 304 is turned off. The delay period 352*a* may be implemented to enable the bandgap reference voltage source 304 to ramp-up and stabilize before being connected to the capacitors 310. Similarly, the delay period 352*b* may be implemented to enable the capacitors 310 to disconnect from the bandgap reference voltage source 304 prior to the bandgap reference voltage source 304 ramping-down.

The reference voltage 314 may correspond to the voltage output by the bandgap reference voltage source 304. As shown in the illustrated embodiment, at steady state the bandgap reference voltage source 304 may output 1.16 volts. Further, the ramp-up and ramp-down periods for the bandgap reference voltage source 304 are illustrated as the sloped portions of reference voltage 314.

The output voltage 316 may correspond to the reference voltage seen by downstream components such as transistor gate 306 and the voltage across capacitor 310*b*. As shown in the illustrated embodiment, the output voltage 316 may be equal to the reference voltage 314 when the capacitors are connected to the bandgap reference voltage source 304 and the output voltage 316 may begin to increase due to leakage current when the capacitors are disconnected from the bandgap reference voltage source 304. Additionally, when the capacitors are reconnected to the bandgap reference voltage source 304, the output voltage 316 may return to the reference voltage 314. The change in voltage of the output voltage 316 when the capacitors are reconnected to the bandgap reference voltage source 304 may include the voltage ripple 354.

Figure 4:
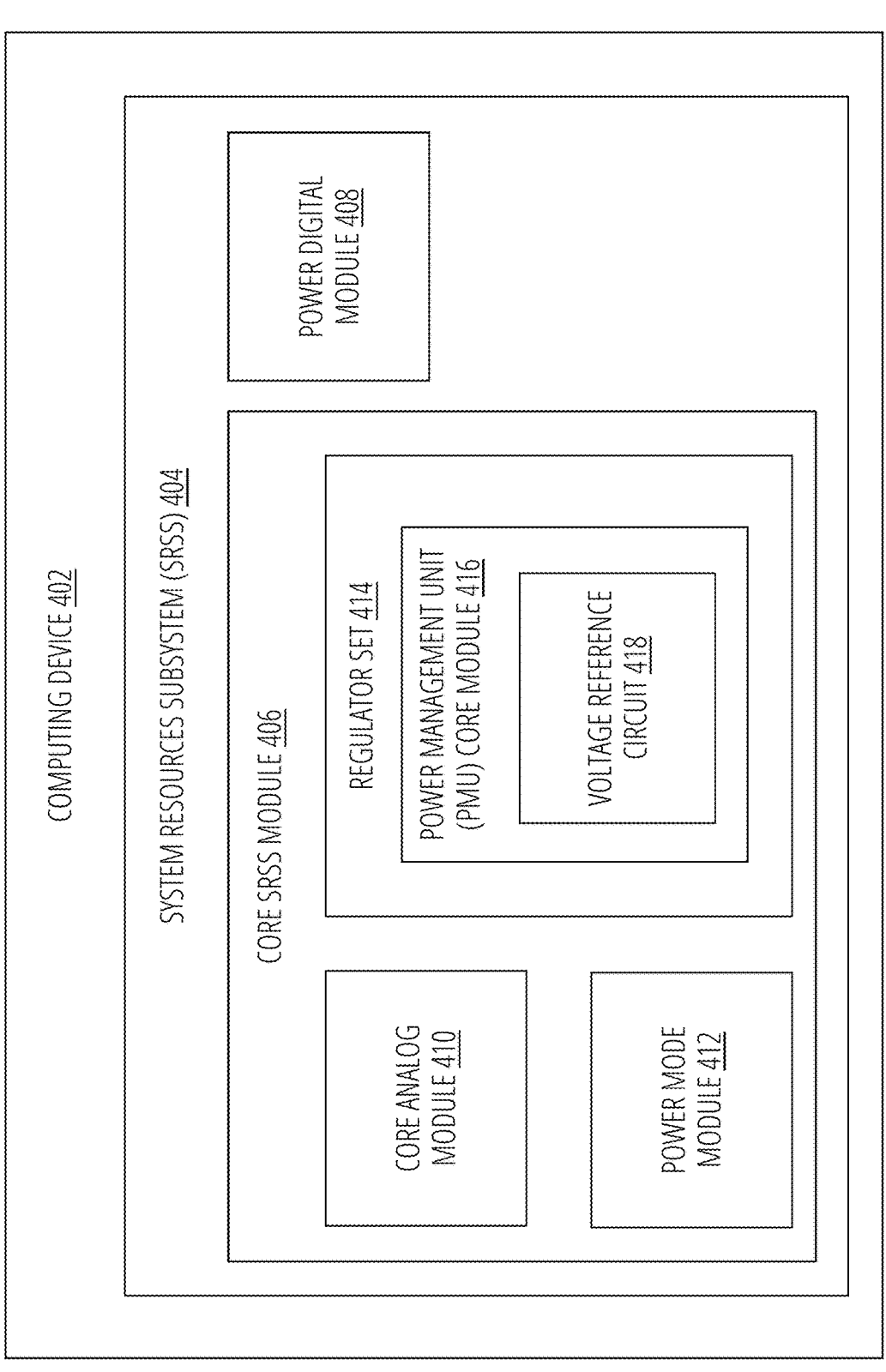
FIG. 4 illustrates an exemplary computing device with a voltage reference circuit for dynamic power cycling according to some embodiments.

FIG. 4 illustrates an exemplary computing device 402 with a system resources subsystem (SRSS) 404 having a voltage reference circuit 418 for dynamic power cycling according to some embodiments. Generally, the SRSS may include various global resources and/or functionalities for the computing device, such as voltage references, clocks, buffers, registers, and the like. The illustrated embodiment includes SRSS 404 with a core SRSS module 406 and a power digital module 408. The core SRSS module 406 may include a core analog module 410, a power mode module 412, and a regulator set 414. The regulator set 414 includes a power management unit (PMU) core module 416 with a voltage reference circuit 418. In FIG. 4, the voltage reference circuit 418 may provide a key component for implementing an efficient architecture in computing device 402. In many embodiments, the computing device 402 may include one or more of a BLE, Wi-Fi, and MC device. One or more components of FIG. 4 may be the same or similar to one or more other components disclosed hereby. For example, voltage reference circuit 418 may be the same or similar to voltage reference circuit 102 and/or bandgap voltage reference circuit 300a. In another example, computing device 402 may be the same or similar to computing device 100. Further, aspects discussed with respect to various components in FIG. 4 may be implemented by one or more other components from one or more other embodiments without departing from the scope of this disclosure. Embodiments are not limited in this context.

As previously mentioned, the SRSS 404 may include various global resources and functionalities for the computing device 402. For example, in addition to the core analog module 410, power mode module 412, and regulator set 414, the core SRSS module 406 may include one or more of hibernate data registers, keys (e.g., wrapped keys), clock control, clock multiplexing (muxing), clock supervision, a parallel key writer, advanced high-performance bus (AHB), AHB interface and technology independent (TIND) registers, reset control, a watchdog timer (WDT), a multi-counter WDT, test mode entry/exit, digital discrete Fourier transform (DFT) muxes, clock calibration, real-time clocks, and alarms. The power digital module 408 may include one or more of a main power processing unit (PPU), power clock generation, a product data control module (PDCM), and a main power control state machine (PCSM). The core analog module 410 of the core SRSS module 406 may include one or more of a power-on reset (POR) circuit, a brown-out detection (BOD) circuit, active mode reference, deep sleep mode reference, internal medium-frequency oscillator (IMO)/internal high-frequency oscillator (IHO), voltage reference buffer, and SRSS approximate DFT (ADFT) muxes. The power mode module 412 may include one or more of power mode control, sleep control, and a transmission and distribution of electrical power (TDEP) circuit control. In addition to the PMU core module 416 and voltage reference circuit 418, the regulator set 414 may include one or more of a static random access memory regulator, software defined radios (SDRs), a buck converter, and a low-voltage detection (LVD) circuit (e.g., battery voltage LVD).

As previously discussed, the techniques disclosed hereby may enable adherence to a maximum allowable ripple voltage while adaptively minimizing the duty cycle of a voltage reference. The maximum allowable ripple voltage may be configured to prevent unintended effects in downstream components of the computing device 402. For example, the maximum allowable ripple voltage may be configured with a value that prevents tripping the BOD circuit while power cycling the voltage reference. In another example, the maximum allowable ripple voltage may be configured with a value that prevents tripping the LVD circuit while power cycling the voltage reference.

Figure 5:
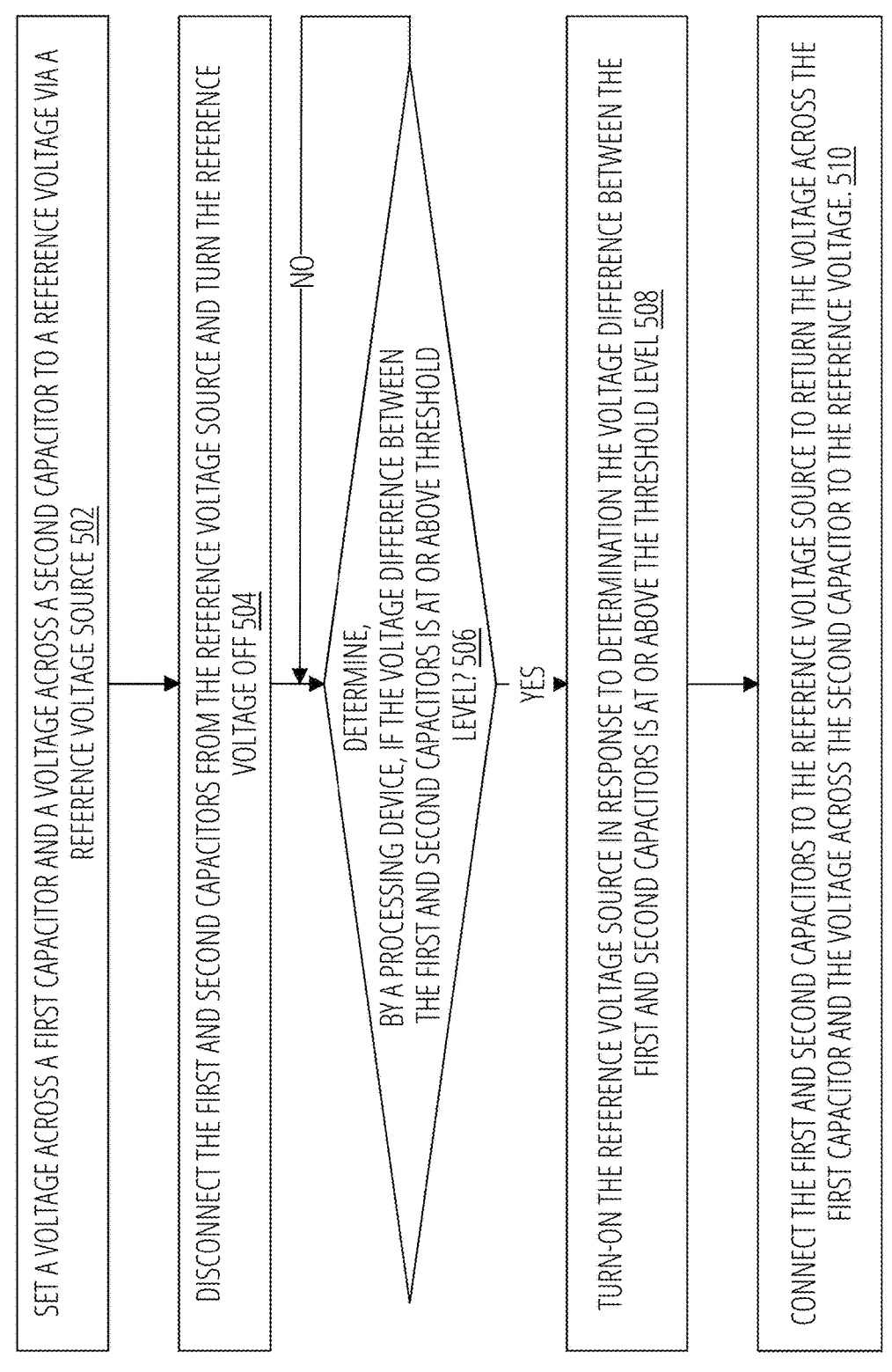
FIG. 5 illustrates an exemplary logic flow for dynamic power cycling a reference voltage source according to some embodiments.

FIG. 5 illustrates a logic flow 500 for dynamic power cycling a reference voltage source according to some embodiments. The logic flow 500 may be performed by processing logic that may include hardware and/or control logic (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of logic flow 500 may be performed by one or more components of voltage reference circuit 102, bandgap voltage reference circuit 300a, or voltage reference circuit 418. Embodiments are not limited in this context.

With reference to FIG. 5, logic flow 500 illustrates example functions used by various embodiments. Although specific function blocks ("blocks") are disclosed in logic flow 500, such blocks are examples. That is, embodiments are well suited to performing various other blocks or variations of the blocks recited in logic flow 500. It is appreciated that the blocks in logic flow 500 may be performed in an order different than presented, and that not all of the blocks in logic flow 500 may be performed.

Logic flow 500 begins at block 502, where a voltage across a first capacitor and a voltage across a second capacitor may be set to a reference voltage via a reference voltage source. For example, the voltage across capacitors 310 may be set to reference voltage 314 via bandgap reference voltage source 304. In some embodiments, this may occur as part during operation in a continuous operating mode. In other embodiments, this may occur after power cycling a voltage reference, such as in a low-power mode. Proceeding to block 504, the first and second capacitors may be disconnected from the reference voltage source and the reference voltage may be turned-off. For example, S/H control logic 302 may operate pMOS transistor 308a to disconnect capacitor 310a from bandgap reference voltage source 304 and pMOS transistor 308b to disconnect capacitor 310b from bandgap reference voltage source 304. In various embodiments, this may occur by sending a signal to the gates of pMOS transistors 308. Additionally, the S/H control logic may turn-off the reference voltage. In some embodiments, this may occur by sending a signal to the bandgap reference voltage source 304. Further, in some embodiments, this may occur in response to entering a low-power mode or as part of power cycling the reference voltage source 304.

At decision block 506, a processing device may determine if the voltage difference between the first and second capacitors is at or above a threshold level. For example, processing device 318 may determine whether the voltage difference between capacitors 310 is at or above a threshold level based on the output of window threshold comparator 312. As previously mentioned, the threshold level of the voltage difference between the first and second capacitors may correspond to a maximum acceptable ripple voltage. If the voltage difference between the first and second capacitors is not at or above the threshold level, the logic flow 500 may return to decision block 506. However, if the voltage difference between the first and second capacitors is at or above a threshold level, the logic flow 500 may proceed to block 508. At block 508 the reference voltage source may be turned on in response to determination the voltage difference between the first and second capacitors is at or above the threshold level. For example, S/H control logic 302 may turn bandgap reference voltage source 304 on in response to a determination that the voltage difference between the first and second capacitors is at or above the threshold level.

Proceeding to block 510, the first and second capacitors may be connected to the reference voltage source to return the voltage across the first capacitor and the voltage across the second capacitor to the reference voltage. For example, S/H control logic 302 may operate pMOS transistors 308 to connect the first and second capacitors 310 to bandgap reference voltage source 304. Further, the voltage across the first and second capacitors 310 may return to the reference voltage 314.

In the above description, some portions of the detailed description are presented in terms of algorithms and symbolic representations of operations on analog signals and/or digital signals or data bits within a non-transitory storage medium. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

Reference in the description to "an embodiment," "one embodiment," "an example embodiment," "some embodiments," "various embodiments", and the like means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," "various embodiments", and the like in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "operating," "identifying", "determining," "operating," "sending," "receiving," "generating," "switching," or the like, refer to the actions and processes of a processing device, an integrated circuit (IC) controller, or similar electronic device, that manipulates and transforms data represented as physical (e.g., electronic) quantities within the controller's registers and memories into other data similarly represented as physical quantities within the controller memories or registers or other such information non-transitory storage medium.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes at least one of A or B" or "X includes A or B" is intended to mean any of the natural inclusive permutations. That is, if X includes A; X includes B; or X includes both A and B, then "X includes at least one of A or B" or "X includes A or B" is satisfied under any of the foregoing instances. Similarly, "X includes one or more of A and B" should be interpreted the same as "X includes at least one of A or B". In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus (e.g., such as a wireless communication device including at least one of an end device, a client device, a station (STA), an access point, a router, or a co-ordinator) for performing the operations herein. This apparatus may be specially constructed for the demanded purposes, or it may include firmware or hardware logic selectively activated or reconfigured by the apparatus. Such firmware may be stored in a non-transitory computer-readable storage medium, such as, but not limited to, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments. Further, a "computer-readable medium" or "computer-readable storage medium" may be non-transitory.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:

setting a voltage across a first capacitor and a voltage across a second capacitor to a reference voltage via a reference voltage source;

disconnecting the first and second capacitors from the reference voltage source;

turning-off the reference voltage source;

turning-on the reference voltage source in response to determining a voltage difference between the first and second capacitors due to leakage current is at or above a threshold level corresponding to a maximum change in the voltage across the second capacitor; and connecting the first and second capacitors to the reference voltage source to return the voltage across the first capacitor and the voltage across the second capacitor to the reference voltage.

2. The method of claim 1, wherein the voltage difference between the first and second capacitors comprises a change in the voltage across the first capacitor minus a change in the voltage across the second capacitor.

3. The method of claim 1, wherein the threshold level corresponds to a maximum acceptable ripple voltage.

4. The method of claim 3, wherein the threshold level comprises the maximum acceptable ripple voltage divided by a ratio of a capacitance of the first capacitor to a capacitance of the second capacitor.

5. The method of claim 4, wherein the capacitance of the second capacitor is a value greater than the capacitance of the first capacitor.

6. The method of claim 1, further comprising monitoring an output of a hysteresis comparator to determine the voltage difference between the first and second capacitors is at or above the threshold level, wherein a first input of the hysteresis comparator is coupled to the first capacitor and a second input of the hysteresis comparator is coupled to the second capacitor, the maximum change in the voltage across the second capacitor corresponds to a maximum acceptable ripple voltage experienced by a computing device component coupled to the second capacitor in parallel with the second input of the hysteresis comparator.

7. The method of claim 1, further comprising at least one of waiting a threshold amount of time between turning-on the reference voltage source and connecting the first and second capacitors to the reference voltage source or waiting a threshold amount of time between disconnecting the first and second capacitors from the reference voltage source and turning-off the reference voltage source.

8. The method of claim 1, further comprising:

opening a first switch to disconnect the first capacitor from the reference voltage source;

opening a second switch to disconnect the second capacitor from the reference voltage source;

closing the first switch to connect the first capacitor to the reference voltage source; and closing the second switch to connect the second capacitor to the reference voltage source.

9. The method of claim 8, wherein the first switch comprises a first p-channel metal-oxide semiconductor (pMOS) transistor and the second switch comprises a second pMOS transistor.

10. The method of claim 1, further comprising:

determining activation of a low power mode; and disconnecting the first and second capacitors from the reference voltage source in response to activation of the low power mode.

11. The method of claim 1, wherein the reference voltage source comprises a voltage reference and the reference voltage comprises a bandgap voltage between 1 and 2 volts.

12. A voltage reference circuit, comprising:

a first capacitor having a first capacitance;

a second capacitor having a second capacitance;

a reference voltage source couplable to the first capacitor via a first switch and the second capacitor via a second switch;

a hysteresis comparator having a first input coupled to the first capacitor, a second input coupled to the second capacitor, and an output, wherein the hysteresis comparator is configured to generate output signals based on voltage difference between the first and second capacitors, wherein a first output signal of the output signals is generated when the voltage difference between the first and second capacitors is at or above a threshold level corresponding to a maximum change in voltage across the second capacitor; and control logic coupled to the reference voltage source, the first switch, the second switch, and the output of the hysteresis comparator, wherein the control logic is configured to power cycle the reference voltage source based on the output signals of the hysteresis comparator and the first output signal is configured to cause the control logic to turn on the reference voltage source.

13. The voltage reference circuit of claim 12, wherein a maximum ripple voltage when power cycling the reference voltage source is determined based on the ratio of second capacitance to the first capacitance and the voltage difference between the first and second capacitors.

14. The voltage reference circuit of claim 13, wherein the second capacitance is at least five times larger than the first capacitance.

15. The voltage reference circuit of claim 12, wherein the first switch comprises a first p-channel metal-oxide semiconductor (pMOS) transistor and the second switch comprises a second pMOS transistor.

16. The voltage reference circuit of claim 12, wherein the voltage difference between the first and second capacitors comprises a change in the voltage across the first capacitor minus a change in the voltage across the second capacitor.

17. A system resource subsystem (SRSS), comprising:

a first capacitor;

a second capacitor;

a reference voltage source couplable to the first capacitor via a first switch and the second capacitor via a second switch;

a hysteresis comparator having a first input coupled to the first capacitor, a second input coupled to the second capacitor, and an output;

control logic coupled to the reference voltage source, the first switch, the second switch, and the output of the hysteresis comparator, and the control logic configured to:

set a voltage across the first capacitor and voltage across the second capacitor to a reference voltage via the reference voltage source;

open the first and second switches to disconnect the first and second capacitors from the reference voltage source;

turn-off the reference voltage source;

turn-on the reference voltage source in response to a determination a voltage difference between the first and second capacitors due to leakage current is at or above a threshold level corresponding to a maximum change in the voltage across the second capacitor; and close the first and second switches to connect the first and second capacitors to the reference voltage source to return the voltage across the first capacitor and the voltage across the second capacitor to the reference voltage.

18. The SRSS of claim 17, wherein the first switch comprises a first p-channel metal-oxide semiconductor (pMOS) transistor and the second switch comprises a second pMOS transistor.

19. The SRSS of claim 17, wherein the voltage difference between the first and second capacitors comprises a change in the voltage across the first capacitor minus a change in the voltage across the second capacitor.

20. The SRSS of claim 17, wherein the threshold level corresponds to a maximum ripple voltage below 0.5 millivolts.

* * * * *